(12) United States Patent
Liu et al.

(10) Patent No.: US 12,015,527 B1
(45) Date of Patent: Jun. 18, 2024

(54) EXTENSIBLE METHOD FOR ORGANIZATIONAL MAPPING VIA CLOUD RESOURCE CONSUMPTION

(71) Applicant: Google LLC, Mountain View, CA (US)

(72) Inventors: Michael Yang Liu, Santa Clara, CA (US); Subhashish Roy, Bengaluru (IN); Srinivas Vaidyanathan, Chennai (IN); Anurag Kumar Singh, Lucknow (IN); Arvind Sundararajan, Saratoga, CA (US); Michael Sun Yu, Bellevue, WA (US); Srirama Koneru, Redwood City, CA (US); Spiro Michaylov, Redmond, WA (US); Neduvelil Vinod Menon, Bengaluru (IN); Shashwat Rastogi, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/170,027

(22) Filed: Feb. 16, 2023

(51) Int. Cl.
*G06F 15/16* (2006.01)
*H04L 41/0894* (2022.01)
*H04L 41/0897* (2022.01)

(52) U.S. Cl.
CPC ...... *H04L 41/0897* (2022.05); *H04L 41/0894* (2022.05)

(58) Field of Classification Search
CPC .......... H04L 41/0897; H04L 41/0894
USPC ........................................... 709/223
See application file for complete search history.

(56) References Cited

U.S. PATENT DOCUMENTS

| | | | |
|---|---|---|---|
| 6,072,493 A | 6/2000 | Driskell et al. | |
| 6,947,989 B2 * | 9/2005 | Gullotta | G06F 21/6218 379/201.12 |
| 7,707,623 B2 * | 4/2010 | Cicchitto | H04L 63/105 726/4 |
| 7,950,049 B2 * | 5/2011 | Chiou | G06F 21/6227 726/4 |
| 8,356,302 B1 * | 1/2013 | Calman | H04L 67/75 358/1.15 |
| 8,402,514 B1 * | 3/2013 | Thompson | H04L 63/08 726/4 |
| 8,407,202 B2 * | 3/2013 | Liu | G06F 16/9537 707/708 |
| 8,452,873 B2 * | 5/2013 | Chen | H04L 67/51 709/239 |
| 8,762,409 B2 * | 6/2014 | Liu | G06F 16/951 707/765 |
| 8,931,057 B2 * | 1/2015 | Cicchitto | H04L 63/102 726/4 |
| 8,959,221 B2 * | 2/2015 | Morgan | G06Q 30/04 709/201 |
| 9,146,996 B2 * | 9/2015 | Liu | G06F 16/951 |
| 9,313,207 B2 * | 4/2016 | Cicchitto | G06F 21/6227 |
| 9,547,764 B2 * | 1/2017 | Biswas | H04L 63/10 |

(Continued)

OTHER PUBLICATIONS

Extended European Search Report for European Patent Application No. 23189853.7 dated Jan. 26, 2024. 6 pages.

*Primary Examiner* — Alicia Baturay (74) *Attorney, Agent, or Firm* — Lerner David LLP (57) ABSTRACT

Maintaining an organizational hierarchy by receiving data indicative of computing resource consumption by one or more leaf nodes, wherein the leaf nodes are part of a hierarchy including the leaf nodes and higher level nodes; and generating one or more modifications for the hierarchy based on the data indicative of computing resource consumption.

17 Claims, 5 Drawing Sheets

(56) References Cited

U.S. PATENT DOCUMENTS

| | | | |
|---|---|---|---|
| 9,582,309 B2* | 2/2017 | Pannem | G06F 9/45558 |
| 9,645,899 B1* | 5/2017 | Felstaine | G06F 11/2035 |
| 9,710,296 B2* | 7/2017 | Pannem | G06F 9/45558 |
| 9,769,177 B2* | 9/2017 | Park | H04L 63/104 |
| 9,806,979 B1* | 10/2017 | Felstaine | H04L 43/10 |
| 10,291,543 B1* | 5/2019 | Felstaine | H04L 41/082 |
| 10,476,748 B2* | 11/2019 | Hiltunen | G06F 9/45558 |
| 10,608,954 B2* | 3/2020 | Gosselin-Harris | H04L 47/782 |
| 10,715,458 B1* | 7/2020 | Cahill | H04L 47/70 |
| 11,023,441 B2 | 6/2021 | Mugali et al. | |
| 11,093,838 B2* | 8/2021 | McCann | G06F 16/9537 |
| 11,121,917 B1* | 9/2021 | Chang | H04L 41/0806 |
| 11,271,948 B2* | 3/2022 | Hermoni | H04L 41/0897 |
| 11,336,721 B2* | 5/2022 | Parulkar | H04L 67/1085 |
| 11,411,881 B2* | 8/2022 | Cahill | H04L 67/146 |
| 11,595,251 B2* | 2/2023 | Chang | H04L 41/0895 |
| 11,663,555 B2* | 5/2023 | Alabdrabalnabi | G06Q 10/105 |
| | | | 705/7.15 |
| 2004/0162906 A1* | 8/2004 | Griffin | H04L 63/10 |
| | | | 709/229 |
| 2004/0181476 A1* | 9/2004 | Smith | G06Q 40/00 |
| | | | 705/35 |
| 2005/0096922 A1 | 5/2005 | Huberman et al. | |
| 2009/0292654 A1* | 11/2009 | Katiyar | G06Q 30/06 |
| | | | 705/412 |
| 2012/0185776 A1* | 7/2012 | Kirshenbaum | G06F 9/5094 |
| | | | 715/735 |
| 2015/0212856 A1 | 7/2015 | Shanmuganathan et al. | |
| 2019/0086452 A1* | 3/2019 | Ranjan | G06Q 50/06 |
| 2020/0097489 A1 | 3/2020 | Collins et al. | |

\* cited by examiner

EXTENSIBLE METHOD FOR ORGANIZATIONAL MAPPING VIA CLOUD RESOURCE CONSUMPTION

BACKGROUND

A hierarchical mapping of an organization is typically created by assigning the organization's people to divisions within the organization based on a human assignor's perceptions of the peoples' responsibilities and the assignor's perception of the appropriate divisions. Further, modifications of such a hierarchical mapping are also based on human perception and are typically performed on an ad-hoc basis.

BRIEF SUMMARY

It has been recognized that hierarchical mappings for organizations can be generated and modified based on the organizations' cloud computing resource consumption, with or without inputs based on human perception. By generating and modifying an organization's hierarchies in this manner, the hierarchies can be readily updated and easily tailored to an organization's needs, based on the organization's consumption of cloud computing resources.

By way of illustration, a video sharing service company is considered. For a video sharing service company there may be a video transcoding service that transcodes uploaded videos; there may be a storage service that stores the videos; there may be a user authentication service and attendant user preferences, favorites, messaging, etc. services; and there may be a service that maintains a catalog of all of the videos uploaded, and so on. All of these individual services consume cloud computing capacity in the form of Central Processing Unit (CPU), Random Access Memory (RAM), Solid State Drive (SSD), Disk, etc. Therefore, a way to visualize the video sharing service company is to visualize the way its cloud resource consumer nodes (akin to the lowest entities, the employees, within a company) are organized into, teams as indicated by the resources consumed by each node, and how the resource consumer nodes in-turn organize into a tree of teams→departments→subdivisions→divisions, etc.

The presently disclosed technology provides for scalable organizing of a collection of consumer nodes into a hierarchy when that hierarchy constantly changes. The consumer nodes, e.g., groups consuming computing capacity, are important to a digital native company such as a video sharing service company because the nodes represent budget and cost bearing entities, with the infrastructure costs attributed to the nodes often exceeding the budget for the company's employees. These nodes, often numbering in the tens to hundreds of thousands, sometimes get "re-orged" on a daily basis. Therefore, it is desirable to have an extensible, flexible, and easily updatable mechanism to represent the machine consumer node "org chart" for any cloud service consumer.

In view of the desire for hierarchical mapping of organizations that is extensible, flexible, and easily updatable, the presently disclosed technology is provided.

In one aspect, the presently disclosed technology provides a method of maintaining an organizational hierarchy including receiving data indicative of computing resource consumption by one or more of a multiple of leaf nodes, wherein the leaf nodes are part of a hierarchy having the leaf nodes and a multiple of higher level nodes; and generating one or more modifications for the hierarchy based on the data indicative of computing resource consumption.

In another aspect, the presently disclosed technology provides a system for maintaining an organizational hierarchy including a metrics aggregator module for receiving data indicative of computing resource consumption by one or more of a multiple of leaf nodes, wherein the leaf nodes are part of a hierarchy having the leaf nodes and a multiple of higher level nodes; and a hierarchy rules module for generating one or more modifications for the hierarchy based on the data indicative of computing resource consumption.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure concerns an extensible mechanism for representing cloud resource consumer nodes within a hierarchical structure that reflects the planning, budgeting, and operations functions within an organization. As part of the disclosure, it is recognized that there are often different hierarchies that represent distinct functions within an organization. For example, a planning set can consist of consumer nodes A, B, C, X, Y, Z, whereas budgeting may represent A, B, C as a separate department from X, Y, Z, and operations may tackle A, X separate from B, Y separate from C, Z. Accordingly, the disclosed technology organizes consumer nodes into entity sets, entity mapping, and finally a hierarchy. An "entity set" is a set of consumer node entities, such as consumer node entities belonging to a production group or consumer node entities associated with a product stock keeping unit (SKU). An "entity set mapping" is a mapping of entities (belonging to a single entity set) to nodes in a hierarchy. A mapping essentially defines a "view" on the hierarchy where entities are attached as leaf nodes to the existing hierarchy. A "hierarchy" represents a single hierarchy of nodes, including leaf nodes and higher level nodes. Thus, the invention may be characterized as a hierarchy service that enables hierarchy changes, change approval workflow, and audit history.

Figure 1:
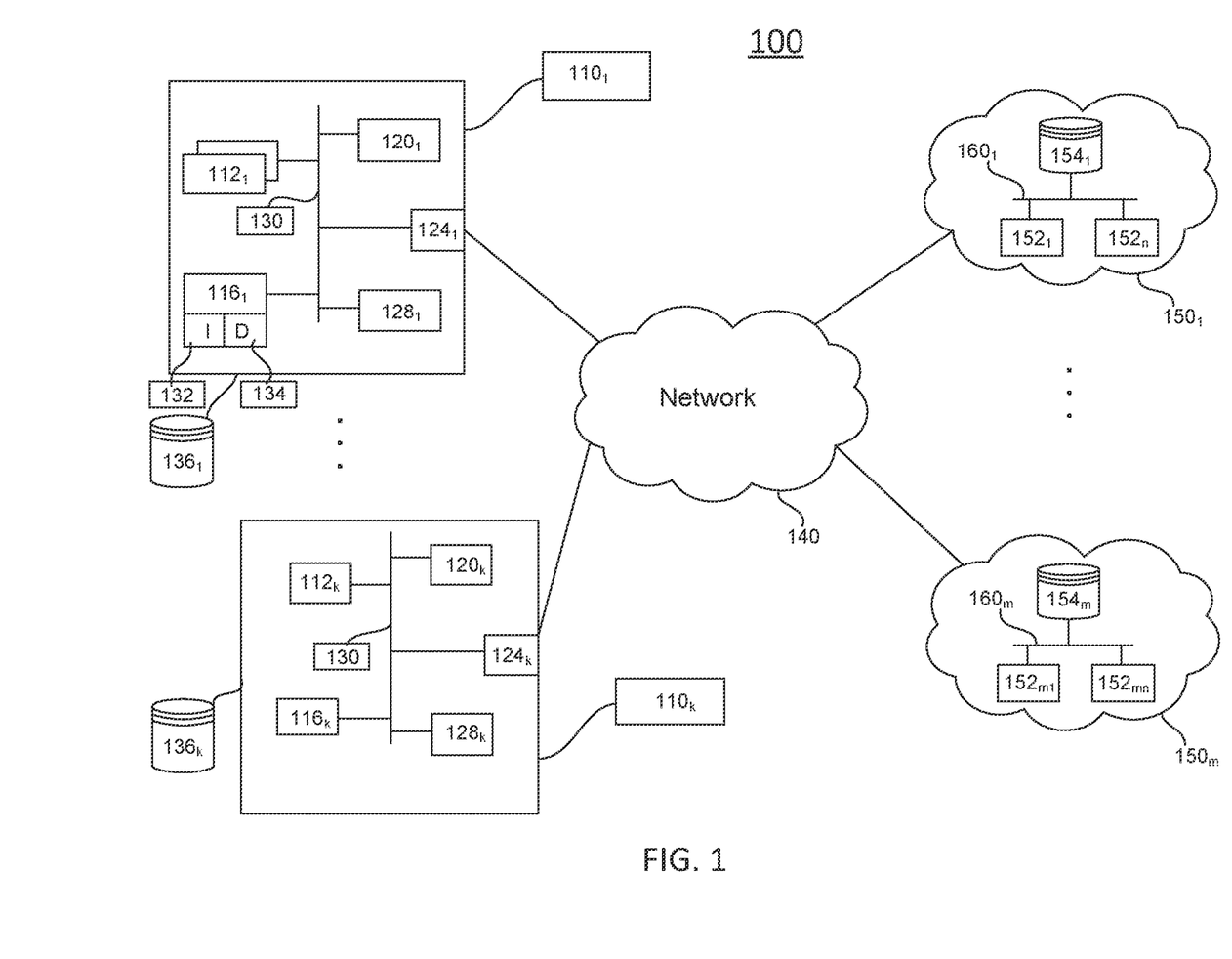
FIG. 1 is a block diagram of an example computing system in which the presently disclosed technology may be implemented.

Turning now to FIG. 1, the figure is a block diagram of an example computing system 100 in which the presently disclosed technology may be implemented. System 100 includes one or more computing devices 110, which may comprise computing devices $110_1$ through $110_k$, a network 140 and one or more cloud computing systems 150, which may comprise cloud computing systems $150_1$ through $150_m$. Computing devices 110 may comprise computing devices (e.g., cloud resource consumer nodes) located at entity locations (e.g., employees' offices) that make use of cloud computing services such as Infrastructure as a Service (IaaS), Platform as a Service (PaaS), and/or Software as a Service (SaaS). For example, if a computing device 110 is located at a business enterprise, computing device 110 may use cloud systems 150 as a service that provides software applications (e.g., accounting, word processing, inventory tracking, etc. applications) to computing devices 110 used in operating enterprise systems. As an alternative example, computing device 110 may lease infrastructure in the form of virtual machines on which software applications are run to support enterprise operations.

As shown in FIG. 1, each of computing devices 110 may include one or more processors 112, memory 116 storing data (D) and instructions (I), display 120, communication interface 124, and input system 128, which are shown as interconnected via network 130. Computing device 110 may also be coupled or connected to storage 136, which may comprise local or remote storage, e.g., on a Storage Area Network (SAN), that stores data accumulated as part of an entity's operation. Computing device 110 may comprise a standalone computer (e.g., desktop or laptop) associated with an entity or a server associated with an entity. A given entity may also implement as part of its business multiple computing devices as servers. If a standalone computer, network 130 may comprise data buses, etc., internal to a computer; if a server, network 130 may comprise one or more of a local area network, virtual private network, wide area network, or other types of networks described below in relation to network 140. Memory 116 stores information accessible by the one or more processors 112, including instructions 132 and data 134 that may be executed or otherwise used by the processor(s) 112. The memory 116 may be of any type capable of storing information accessible by the processor, including a computing device-readable medium, or other medium that stores data that may be read with the aid of an electronic device, such as a hard-drive, memory card, RAM, Read Only Memory (ROM), Digital Versatile Disc (DVD), or other optical disks, as well as other write-capable and read-only memories. Systems and methods may include different combinations of the foregoing, whereby different portions of the instructions and data are stored on diverse types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods, and routines of the instructions are explained in more detail below.

The data 134 may be retrieved, stored, or modified by processor 112 in accordance with the instructions 132. As an example, data 134 associated with memory 116 may comprise data used in supporting services for one or more client devices, an application, etc. Such data may include data to support hosting web-based applications, file share services, communication services, gaming, sharing video or audio files, or any other network based services.

The one or more processors 112 may be any conventional processor, such as commercially available CPUs. Alternatively, the one or more processors may be a dedicated device such as an Application-Specific Integrated Circuit (ASIC) or other hardware-based processor. Although FIG. 1 functionally illustrates the processor, memory, and other elements of computing device 110 as being within a single block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing, and transmitting the data to and from other computing devices as part of an entity's business operation.

Computing device 110 may also include a display 120 (e.g., a monitor having a screen, a touchscreen, a projector, a television, or other device that is operable to display information) that provides a user interface that allows for controlling the computing device 110 and accessing user space applications and/or data associated Virtual Machines (VMs) supported in one more cloud systems 150, e.g., on a host in a cloud system 150. Such control may include, for example, using a computing device to cause data to be uploaded through input system 128 to cloud system 150 for processing, cause accumulation of data on storage 136, or more generally, manage various aspects of an entity's computing system. In some examples, computing device 110 may also access an Application Programming Interface (API) that allows it to specify workloads or jobs that run on VMs in the cloud as part of IaaS or SaaS. While input system 128 may be used to upload data, e.g., a Universal Serial Bus (USB) port, computing device 110 may also include a mouse, keyboard, touchscreen, or microphone that can be used to receive commands and/or data.

The network 140 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, Wi-Fi, Hypertext Transfer Protocol (HTTP), etc. and various combinations of the foregoing. Such communication may be facilitated by any device capable of transmitting data to and from other computing devices, such as modems and wireless interfaces. Computing device interfaces with network 140 through communication interface 124, which may include the hardware, drivers, and software necessary to support a given communications protocol.

Cloud computing systems 150 may comprise one or more data centers that may be linked via high speed communications or computing networks. A given data center within system 150 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well as to provide redundancy and maintain high availability. Similarly, different cloud computing systems are typically provided at different geographic locations.

As shown in FIG. 1, computing system 150 may be illustrated as comprising host machines 152, storage 154, and infrastructure 160. Host machines 152, storage 154, and infrastructure 160 may comprise a data center within a cloud computing system 150. Infrastructure 160 may comprise switches, physical links (e.g., fiber), and other equipment used to interconnect host machines within a data center with storage 154. Storage 154 may comprise a disk or other storage device that is partitionable to provide physical or virtual storage to virtual machines running on processing devices within a data center. Storage 154 may be provided as a Storage Area Network (SAN) within the datacenter hosting the virtual machines supported by storage 154 or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS, or SaaS to entities or users as a result of requests for services originating at, for example, computing devices 110.

In an embodiment of the presently disclosed technology, a system for maintaining an organizational hierarchy takes the form of one or more modules within system 100. Each module may be in the form of software, hardware, or a combination of software and hardware. For example, all the modules may take the form of software run on one of computing devices 110, or one or more modules may take the form of software run on one of computing devices 110 while one or more other modules may take the form of software run on another one of computing devices 110. As another example, each module may be software run on a separate one of computing devices 110 such that there is one module per device. Moreover, any one of the modules may take the form of software run on more than one of computing devices 110.

Figure 2:
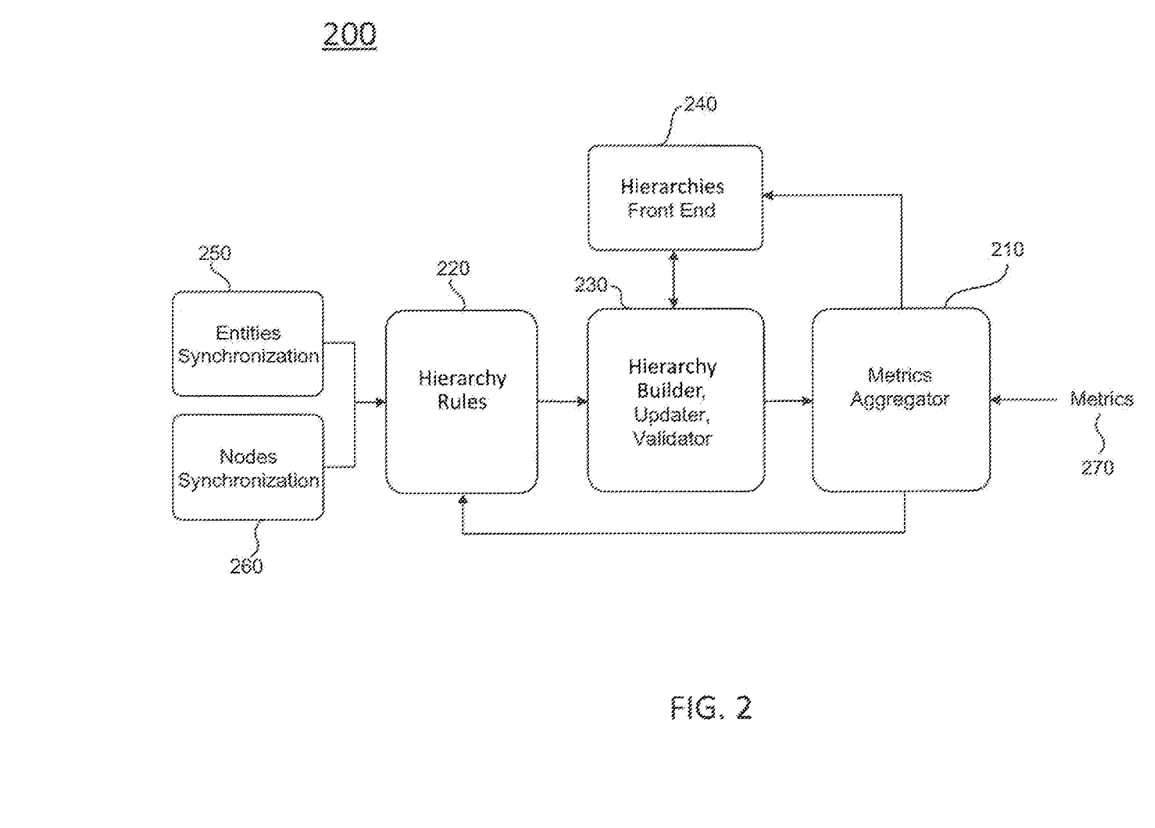
FIG. 2 is a block diagram of modules making up a system for maintaining an organizational hierarchy according to an embodiment.

Referring now to FIG. 2, the figure is a block diagram of modules making up a system 200 for generating and/or maintaining an organizational hierarchy according to an embodiment. The system 200 may include a metrics aggregator module 210, a hierarchy rules module 220, a hierarchy builder-updater-validator module 230, a hierarchies front end module 240, an entities synchronization module 250, and a nodes synchronization module 260. However, not all the modules are required in all embodiments. For instance, an embodiment for maintaining an organizational hierarchy, may include only the metrics aggregator module 210 and the hierarchy rules module 220. In such an embodiment, the metrics aggregator module 210 receives metrics 270 indicative of computing resource consumption by cloud resource consumer nodes of an organization (e.g., computing devices respectively associated with organization employees) and the hierarchy rules module 220 maintains the hierarchy according to data received from the metrics aggregator module 210. Notably, "computing resource consumption" may refer to one or more of computing resource usage, computing resource allocation, computing resource excess stock availability, etc.

As an example, the metrics 270 may concern production group instances. Such production group instances (hereinafter "group instances") may take the form of cloud compute instances. That is, each group instance may be launched by a production group for the purpose of executing one or more tasks in a cloud computing environment, with the group instance employing virtual resources backed by physical machines in one or more data centers.

By way of illustration, the metrics 270 may include one or more of CPU usage (e.g., in seconds or hours) for each group instance, RAM usage (e.g., in gigabytes-seconds) for each group instance, memory storage usage (e.g., in gigabytes) for each group instance, data transited between machines (e.g., in gigabytes) as part of each group instance, and accelerator (e.g., ASIC) usage (e.g., in device-seconds or core seconds) for each group instance. Notably the usages are total usages, not just usages of resources located in any one location. Thus, for example, CPU usage by a group instance includes not only usage of a CPU on which the group instance is launched, but usage of all CPUs accessible to the group instance, such as CPUs available through network 140 of computing system 100.

Moreover, metrics 270 may be indicative of allocations, as contrasted with usages. That is, the metrics 270 may be indicative of resources allocated to cloud resource consumer nodes, but not necessarily used in whole or in part. For example, the metrics 270 may include one or more of CPU usage (e.g., in seconds or hours) allocated to each group instance, RAM usage (e.g., in gigabytes-seconds) allocated to each group instance, memory storage usage (e.g., in gigabytes) allocated to each group instance, allocations for data transit between machines (e.g., in gigabytes) for each group instance, and accelerator (e.g., ASIC) usage (e.g., in device-seconds or core seconds) allocated to each group instance.

Still further, metrics 270 may be indicative of excess stock. That is, the metrics 270 may be indicative of resources available to consumer resource nodes should the nodes exceed allocated resources. For example, the metrics 270 may include one or more of CPU usage (e.g., in seconds or hours) available to each group instance should the group instance require more CPU usage than allocated to the group instance, RAM usage (e.g., in gigabytes-seconds) available for each group instance should the group instance require more RAM usage than allocated to the group instance, memory storage usage (e.g., in gigabytes) available to each group instance should the group instance require the use of memory storage beyond the memory storage allocated to the group instance, amount of data transit between machines (e.g., in gigabytes) available to each group instance should the group instance require a data transit amount greater than the amount allocated to the group instance, and accelerator (e.g., ASIC) usage (e.g., in device-seconds or core seconds) available to each group instance should the group instance require more accelerator usage than allocated to the group instance.

It should be noted that one or more of usages, allocations, and excess stock may be allocated to consumer resource nodes from a pool of resources by a pool administrator. A pool of resources allows for finer grained control by supply administrators who dole out capacity from pools to consumer nodes. The pool could be manually or automatically administered via policies (e.g., a policy of granting resources to a consumer node if the resources are available and the resources do not exceed a preset threshold, such as 100 CPU-hours of CPU or 500 GB-seconds of RAM).

In any event, the metrics aggregator module 210 may aggregate the metrics 270 associated with each consumer node and then pass the aggregated data to the hierarchy rules module 220. The hierarchy rules module 220 may then use the aggregated data to generate a hierarchy modification. For example, if a hierarchy includes a non-leaf node from which a multiple of video sharing service content providers stem as leaf nodes, and aggregate data from the metrics aggregator module 210 indicates that the resources consumed (e.g., CPU and memory) by the video sharing service content providers associated with the non-leaf node exceeds a threshold, the hierarchy rules module 220 may generate a modification specifying that the non-leaf node be split into two non-leaf nodes. As another example, if aggregate data from the metrics aggregator module 210 indicates that a newly appearing device is consuming resources, the hierarchy rules module 220 may generate a modification specifying that newly appearing device be added to the hierarchy and stem from a node determined according to the name of the newly appearing device.

It should be noted that in other embodiments, modifications may be specified by a user rather than by the hierarchy rules module 220, or by a combination of a user and the hierarchy rules module 220. One such embodiment includes the metrics aggregator module 210, the hierarchy rules module 220, and the hierarchies front end module 240. In the embodiment, the hierarchies front end module 240 may include a display and an input interface. The display may be used to display, for example, tables which are generated by the metrics aggregator module 210 and summarize aggregated data. The interface may be used by a human operator for manual curation of the hierarchy. For instance, a human operator may use the interface to manually split a non-leaf node into two non-leaf nodes.

Another embodiment for maintaining an organizational hierarchy includes the metrics aggregator module 210, the hierarchy rules module 220, and the hierarchy builder-updater-validator module 230. In such embodiment, the metrics aggregator module 210 may aggregate the metrics 270 associated with each consumer node and then pass the aggregated data to the hierarchy rules module 220, and the hierarchy rules module 220 may then use the aggregated data to specify a hierarchy modification. The hierarchy modification is, in turn, passed to the hierarchy builder-updater-validator module 230, which may check the modification for validity and update the hierarchy according to the modification if the modification is found valid. To illustrate, a requirement for validity may be that a node cannot stem from two higher level nodes. In that case, if a modification specified by the hierarchy rules module 220 would result in a node stemming from two higher level nodes, the modification is found invalid by the hierarchy builder-updater-validator module 230, and the hierarchy builder-updater-validator module 230 does not make the modification.

Still another embodiment includes the metrics aggregator module 210, the hierarchy rules module 220, the hierarchy builder-updater-validator module 230, and the hierarchies front end module 240. In the embodiment, the hierarchies front end module 240 display may be used to display aggregated data as well as changes made to the hierarchy by the hierarchy builder-updater-validator module 230. The hierarchies front end module 240 interface may be used by a human operator to specify hierarchy modifications that may be checked for validity by the hierarchy builder-updater-validator module 230.

In still other embodiments, the system 200 may generate a hierarchy to be maintained. To generate the hierarchy, the entities synchronization module 250 and the nodes synchronization module 260 may be employed. For example, an embodiment including all of the modules shown in FIG. 2 is considered. In such an embodiment, the entities synchronization module 250 may determine leaf nodes to be included in the generated hierarchy by collecting entity information from one or more sources. One source from which entity information may be collected is a machine registry. The entities synchronization module 250 may collect machine identifiers from the machine registry and pass them to the hierarchy rules module 220. Similarly, the nodes synchronization module 260 may determine higher level nodes to be included in the generated hierarchy by collecting node information from one or more sources, and then pass collected node information to the hierarchy rules module 220. One source from which node information may be collected is a database in which an organization chart is stored.

Upon receiving entity information and node information from the entities synchronization module 250 and the nodes synchronization module 260, the hierarchy rules module 220 may generate a proposed hierarchy by applying a set of business rules to the received information. The proposed hierarchy may then be sent to the hierarchy builder-updater-validator module 230 where the hierarchy may be validated, and built if it is found valid. Once validated and built the hierarchy may be displayed on the hierarchies front end module 240, and maintained through operation of the metrics aggregator module 210, the hierarchy rules module 220, the hierarchy builder-updater-validator module 230, and the hierarchies front end module 240.

The modules of FIG. 2 are, in some embodiments, operable as follows:

Entities Synchronization Module 250—Collects entities (e.g., resource attribution objects) from different entity sources (i.e., systems of truths) and passes them along to the hierarchy rules module 220. Examples of entities include machine identifiers, product SKUs, employee ids and associated metadata. Entities are the leaves in the tree or the lowest layer in the hierarchy.

Nodes Synchronization Module 260—Collects nodes from external sources of truths e.g., organizational structure for a video sharing service and forwards them to the hierarchy rules module 220.

Hierarchy Rules Module 220—Evaluates nodes and entities against a set of business rules that allow for automatic maintenance of hierarchies. Attaches construction/edit metadata to the nodes based on the set of authored business rules. Rolled metrics are also an input to the hierarchy rules module 220 and are reused by the hierarchy rules module 220 to recommend splitting of nodes. For example, a number of machines used by a video sharing service may be grouped into a node. As the amount of resources consumed reaches a threshold, the hierarchy rules module 220 may recommend splitting the node.

Hierarchy Builder-Updater-Validator Module 230—Builds new hierarchies (e.g., deploys validated hierarchies by putting the validated hierarchies to use in a production environment, or by designating the validated hierarchies as being in a general availability (GA) phase), and manages and merges changes to existing hierarchies. Updates can be either human curated or proposed through the hierarchy rules module 220. Hosts an approval flow and policies for automated approvals. Performs continuous validation of the hierarchy structure against constraints such as Mutually Exclusive, Collectively Exhaustive (MECE), Directed Acyclic Graph (DAG), or Tree structure. As an example of an MECE validation process, the hierarchy builder-updater-validator module 230 checks to make sure that no production group entity belongs to more than one hierarchy node, and that all production group entities must belong to a hierarchy node. If no production group entity belongs to more than one node at the same hierarchy level, and all production group entities belong to a node at each hierarchy level, the hierarchy passes the MECE validation test.

Metrics Aggregator Module 210—Uses hierarchies to roll up the metrics 270 and publish tables that can be surfaced in the hierarchies front end module 240. For example, resource consumption by a video sharing service's owned machines are rolled up according to the video sharing service's business verticals organization.

Hierarchies Front End Module 240—Provides visualization of hierarchies and enables manual curation of hierarchies.

Examples of business rules that may be applied by the hierarchy rules module 220 may derive from automated, preset policies, include the following: (1) Reorg: Everything from org A that has been dissolved now belongs to org B; (2) Reorg with finer definitions: From org A that has been dissolved, a first type of workload (e.g., video-processing) that a production group performs belong to org B but any production group that conforms to a second type of workload (e.g., anti-abuse) belong to org C; (3) Restructuring budgets: From org A, budget bearing entities belong to subdivision A-1 and non-budget bearing entities belong to subdivision A-2; and (4) Reorg based on large cost drivers: If consumption from any entities in org A exceeds a dollar threshold (e.g., 500K), move them to a special collection C so we can apply other special logic to their governance. To illustrate how business rules are applied, for example rule (2) when the hierarchy rules module 220 receives metrics 270 indicating that a node X associated with org A is performing video-processing, the hierarchy rules module 220 generates a hierarchy modification of adding the node X to the org B hierarchy.

Figure 3:
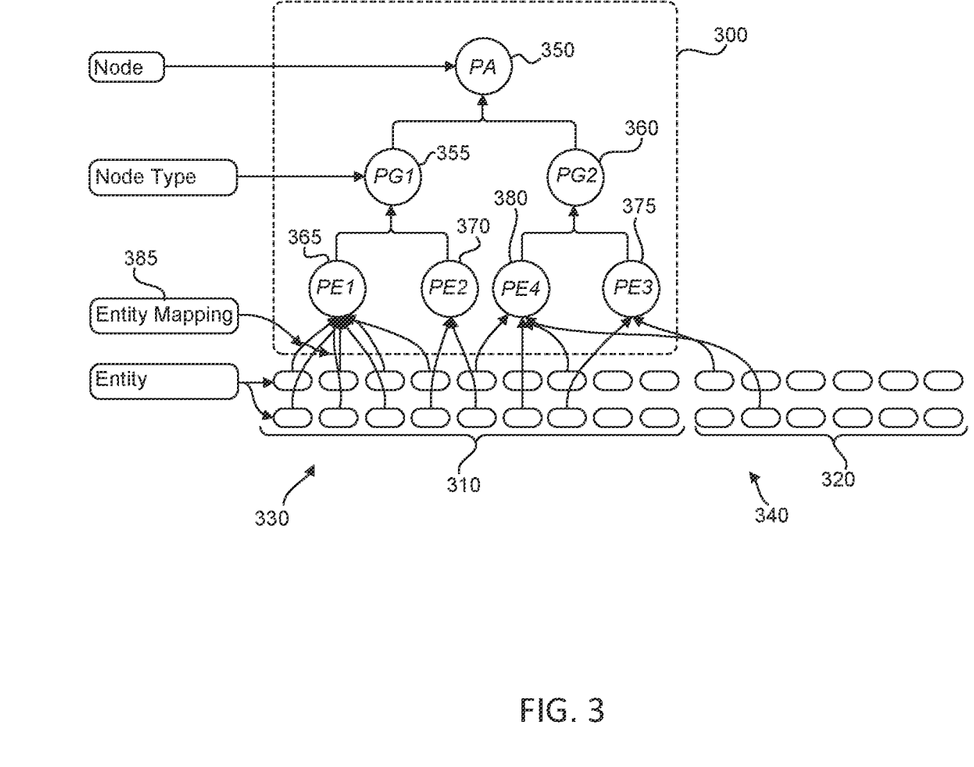
FIG. 3 shows higher level nodes of a hierarchy with mapping to two sets of leaf nodes according to an embodiment.

Referring now to FIG. 3, the figure shows higher level nodes 300 of hierarchies with mappings to a first set of leaf nodes 310 and to a second set of leaf nodes 320 in accordance with an embodiment. When the higher level nodes 300 are mapped to the first set of leaf nodes 310, a first hierarchy 330 is defined. When the higher level nodes 300 are mapped to the second set of leaf nodes 320, a second hierarchy 340 is defined. Further, either one of hierarchies 330 and 340 may be modified such that it takes the form of the other one of hierarchies 330 and 340. For instance, when the hierarchy rules module 220 and the hierarchy builder-updater-validator module 230 of FIG. 2 are employed to maintain the hierarchy 330 made up of the higher level nodes 300 and the first set of leaf nodes 310, the hierarchy rules module 220 may specify a modification of hierarchy 330 by which the higher level nodes 300 are mapped to the second set of leaf nodes 320 rather than to the first set of leaf nodes 310 (i.e., by which the first set of leaf nodes 310 is switched with the second set of leaf nodes 320), and the hierarchy builder-updater-validator module 230 may validate the modification.

By way of illustration, the higher level nodes 300 of FIG. 3 may be payment nodes, and the hierarchies 330 and 340 of FIG. 3 may be payment hierarchies. In one possible configuration, node 350 may represent obtaining payments to a product area (PA), and the PA may be all products of a subsidiary company (hereinafter "Company X"). Nodes 355 and 360 may represent obtaining payments to respective product groups (PG1 and PG2) within the PA, with PG1 being Company X internet browser ads (hereinafter "X browser ads") and PG2 being Company X video sharing service ads (hereinafter "X video ads"). Nodes 365, 370, 375, and 380 may represent efforts made in obtaining payments to respective products (PE1, PE2, PE3, and PE4) within the PGs, with PE1 corresponding to X browser ads—shopping ads, PE2 corresponding to X browser ads—travel ads, PE3 corresponding to X video ads—shopping ads, and PE4 corresponding to S video ads—travel ads. The first set of leaf nodes 310 may represent computing devices that make payments to the product efforts PE1-PE4 so that each of leaf nodes 310 represents one computing device. Whereas the second set of leaf nodes 320 may represent groups identified as making payments to the product efforts PE1-PE4, either through user-spawned jobs or automated jobs, so that each of leaf nodes 320 represents one group. Accordingly, if a user would like to see how payments from computing devices map to nodes 300, the first set of nodes 310 may be mapped to nodes 300 through and entity mapping process 385 and the resulting hierarchy 330 may be displayed to the user (e.g., via the hierarchies front end module 240 of FIG. 2). Likewise, if a user would like to see how payments from groups map to nodes 300, the second set of nodes 320 may be mapped to nodes 300 through and entity mapping process 385 and the resulting hierarchy 340 may be displayed to the user (e.g., via the hierarchies front end module 240 of FIG. 2).

Another feature of the presently disclosed technology is an efficient mechanism for allowing hierarchies to be formed or modified by incorporating portions of other hierarchies. An example is shown in FIG. 4.

Figure 4:
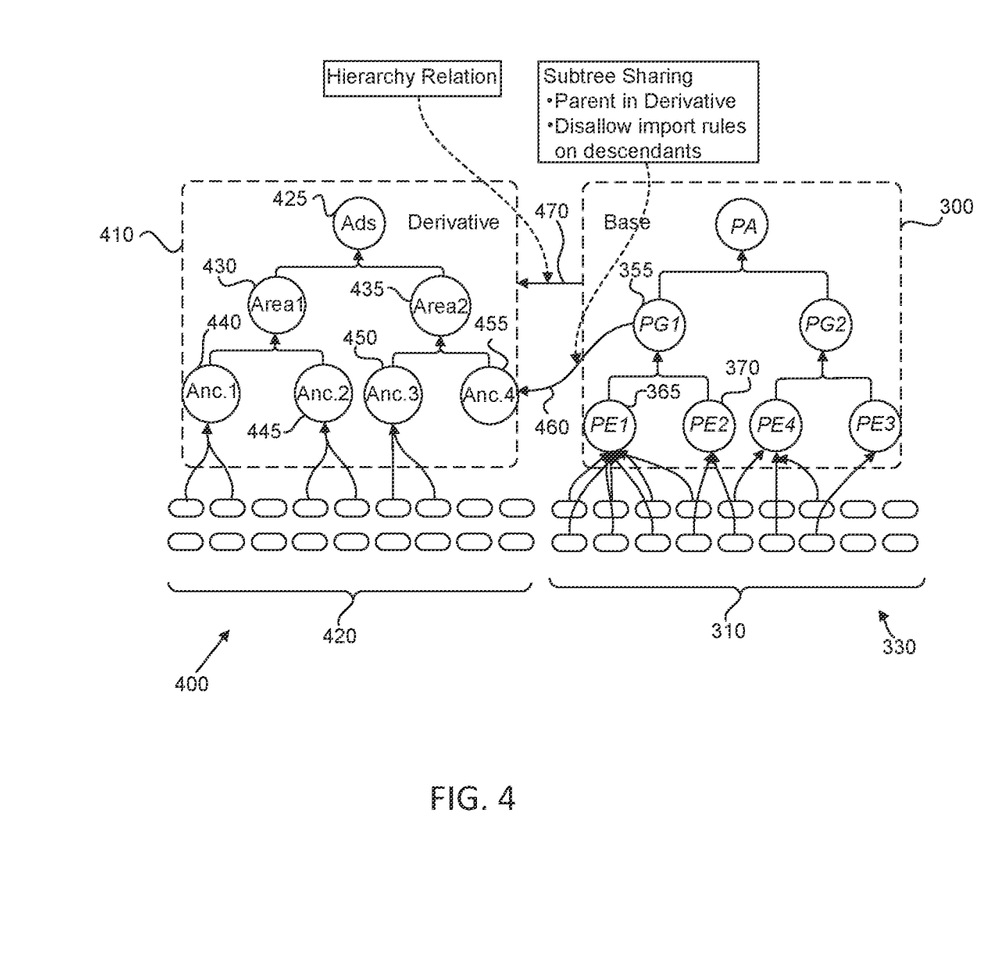
FIG. 4 shows two hierarchies, and depicts how forming or modifying a hierarchy may include adding to the hierarchy a portion of another hierarchy.

FIG. 4 shows two hierarchies, and depicts how forming a hierarchy 400 may include adding to a partial hierarchy structure a portion of another hierarchy 330. Hierarchy 330 is as described in relation to FIG. 3, and is used here as an example to facilitate description. In the context of FIG. 4, hierarchy 330 may be referred to as a base hierarchy, and is related to hierarchy 400. Hierarchy 400 may be referred to as a derivative hierarchy. In the illustrated example, hierarchy 400 is an ads hierarchy having higher level nodes 410 and leaf nodes 420. Node 425 may represent all Company X ads. Node 430 may represent X video ads and Node 435 may represent X browser ads. Node 440 (i.e., "anchor node 1") may represent efforts engaged in creating X video ads, node 445 may represent efforts engaged in obtaining payments for X video ads, node 450 may represent efforts engaged in creating X browser ads, and node 455 may represent efforts engaged in obtaining payments for X browser ads. Since node 455 of hierarchy 400 is the same as node 355 of hierarchy 330 node 355, and all the nodes stemming from node 355, may be shared by hierarchy 400. The sharing is indicated by arrow 460 in FIG. 4. The relationship between the hierarchy 400 and the hierarchy 300 is indicated by arrow 470. As also shown in FIG. 4, a policy of "Disallow import rules on descendants" may be attached to node 355, meaning that none of the nodes below node 355 may be derived from another hierarchy.

One scenario in which the sharing of FIG. 4 may be implemented is upon creation of hierarchy 400. For instance, a user at the hierarchies front end module 240 of FIG. 2 may manually specify higher level nodes 410 and indicate that a hierarchy including such nodes should be created. In response, the hierarchy builder-updater-validator module 230 maps leaf nodes 420 to nodes 440, 445, and 450 of the higher level nodes 410, entity information for the leaf nodes 420 having been received by hierarchy builder-updater-validator module 230 from the entities synchronization module 250 through the hierarchy rules module 220. Regarding node 455 of the higher level nodes 410, the hierarchy builder-updater-validator module 230 recognizes that node 455 is the same as node 355 of existing hierarchy 330, e.g., by noting reuse of a node ID for node 355, and designates for addition to hierarchy 400 the portion of hierarchy 330 including node 355 and all nodes stemming from node 355. The nodes added to hierarchy 400 may include those of leaf nodes 310 that map to nodes 365 and 370.

Figure 5:
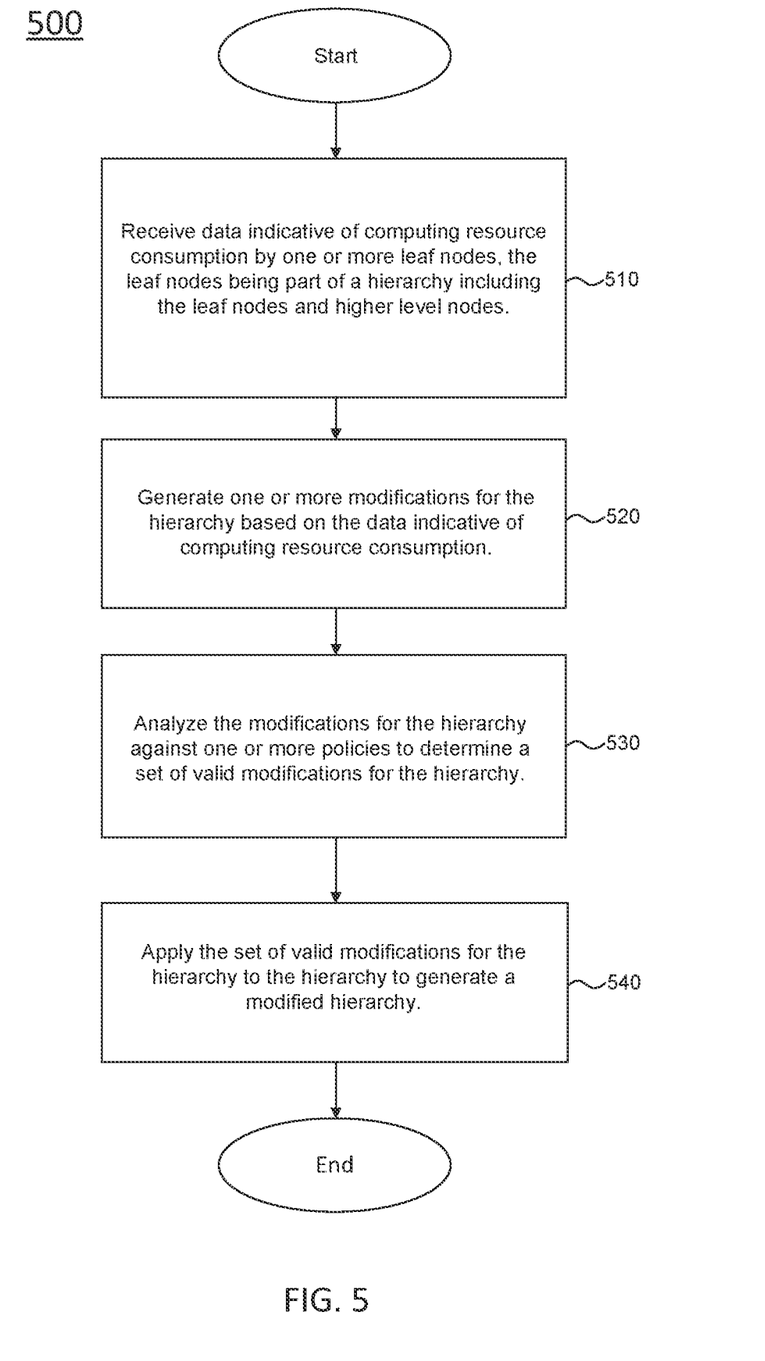
FIG. 5 is a flow chart depicting a method of maintaining an organizational hierarchy according to an embodiment.

Turning now to FIG. 5, the figure is a flow chart depicting a method 500 of maintaining an organizational hierarchy according to an embodiment. The method includes a first step 510 of receiving data indicative of computing resource consumption by one or more leaf nodes, the leaf nodes being part of a hierarchy including the leaf nodes and higher level nodes. The next step, step 520, is generating one or more modifications for the hierarchy based on the data indicative of computing resource consumption. After one or more modifications are generated, the following step, step 530, is analyzing the modifications for the hierarchy against one or more policies to determine a set of valid modifications for the hierarchy. The last step, step 540, is applying the set of valid modifications to the hierarchy to generate a modified hierarchy. The method 500 may be performed, by way of example only, by the hierarchy rules module 220 and the hierarchy builder-updater-validator module 230, with steps 510 and 520 being performed by the hierarchy rules module 220, and steps 530 and 540 being performed by the hierarchy builder-updater-validator module 230.

Embodiments of the present technology include, but are not restricted to, the following.
  (1) A method of maintaining an organizational hierarchy including receiving data indicative of computing resource consumption by one or more of a multiple of leaf nodes, wherein the leaf nodes are part of a hierarchy having the leaf nodes and a multiple of higher level nodes; and generating one or more modifications for the hierarchy based on the data indicative of computing resource consumption.
  (2) The method according to (1), wherein the data indicative of computing resource consumption includes one or more of data indicative of computing resource usage, data indicative of computing resource allocation, and data indicative of computing resource excess stock availability.
  (3) The method according to (1), further including generating the hierarchy by accessing stored data indicative of nodes to be included in the hierarchy.
  (4) The method according to (3), wherein the data indicative of nodes to be included in the hierarchy includes at least a portion of an organization chart.
  (5) The method according to (3), wherein the data indicative of nodes to be included in the hierarchy includes at least a portion of a machine registry.
  (6) The method according to (1), wherein generating one or more modifications for the hierarchy includes specifying mapping of a new leaf node to one of the higher level nodes based on a name of the new leaf node.
  (7) The method according to (1), wherein generating one or more modifications for the hierarchy includes specifying splitting one of the higher level nodes into two or more new higher level nodes.
  (8) The method according to (1), further including analyzing the modifications for the hierarchy against one or more policies to determine a set of valid modifications for the hierarchy.
  (9) The method according to (8), further including applying the set of valid modifications for the hierarchy to the hierarchy to generate a modified hierarchy.
  (10) The method according to (9), further including displaying the modified hierarchy.
  (11) The method according to (8), wherein the one or more policies comprises a policy that no leaf node can stem from more than one higher level node.
  (12) The method according to (1), wherein generating one or more modifications for the hierarchy includes specifying addition of at least a portion of another hierarchy to the hierarchy.
  (13) The method according to (1), wherein generating one or more modifications for the hierarchy includes specifying the designation switching a multiple of new leaf nodes with the multiple of leaf nodes.
  (14) A system for maintaining an organizational hierarchy including a metrics aggregator module for receiving data indicative of computing resource consumption by one or more of a multiple of leaf nodes, wherein the leaf nodes are part of a hierarchy having the leaf nodes and a multiple of higher level nodes; and a hierarchy rules module for generating one or more modifications for the hierarchy based on the data indicative of computing resource consumption.
  (15) The system according to (14), wherein the data indicative of computing resource consumption includes one or more of data indicative of computing resource usage, data indicative of computing resource allocation, and data indicative of computing resource excess stock availability.
  (16) The system according to (14), further including a hierarchy builder-validator-updater module for analyzing the modifications for the hierarchy against one or more policies to determine a set of valid modifications for the hierarchy, and applying the set of valid modifications for the hierarchy to the hierarchy to generate a modified hierarchy.
  (17) The system according to (14), wherein the system is operable to generate the hierarchy, and the system further includes an entities synchronization module for accessing stored data indicative of leaf nodes to be included in the hierarchy; and a nodes synchronization module for accessing stored data indicative of leaf nodes to be included in the hierarchy.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method of maintaining an organizational hierarchy comprising:
 receiving data indicative of computing resource consumption by one or more of a plurality of leaf nodes, wherein the leaf nodes are part of a hierarchy comprising the leaf nodes and a plurality of higher level nodes; and
 generating one or more modifications for the hierarchy based on the data indicative of computing resource consumption.

2. The method according to claim 1, wherein the data indicative of computing resource consumption comprises one or more of data indicative of computing resource usage, data indicative of computing resource allocation, and data indicative of computing resource excess stock availability.

3. The method according to claim 1, further comprising generating the hierarchy by accessing stored data indicative of nodes to be included in the hierarchy.

4. The method according to claim 3, wherein the data indicative of nodes to be included in the hierarchy comprises at least a portion of an organization chart.

5. The method according to claim 3, wherein the data indicative of nodes to be included in the hierarchy comprises at least a portion of a machine registry.

6. The method according to claim 1, wherein generating one or more modifications for the hierarchy comprises specifying mapping of a new leaf node to one of the higher level nodes based on a name of the new leaf node.

7. The method according to claim 1, wherein generating one or more modifications for the hierarchy comprises specifying splitting one of the higher level nodes into two or more new higher level nodes.

8. The method according to claim 1, further comprising analyzing the modifications for the hierarchy against one or more policies to determine a set of valid modifications for the hierarchy.

9. The method according to claim 8, further comprising applying the set of valid modifications for the hierarchy to the hierarchy to generate a modified hierarchy.

10. The method according to claim 9, further comprising displaying the modified hierarchy.

11. The method according to claim 8, wherein the one or more policies comprises a policy that no leaf node can stem from more than one higher level node.

12. The method according to claim 1, wherein generating one or more modifications for the hierarchy comprises specifying addition of at least a portion of another hierarchy to the hierarchy.

13. The method according to claim 1, wherein generating one or more modifications for the hierarchy comprises specifying switching a plurality of new leaf nodes with the plurality of leaf nodes.

14. A system for maintaining an organizational hierarchy comprising
 one or more computing devices to implement:
  a metrics aggregator module for receiving data indicative of computing resource consumption by one or more of a plurality of leaf nodes, wherein the leaf nodes are part of a hierarchy comprising the leaf nodes and a plurality of higher level nodes; and
  a hierarchy rules module for generating one or more modifications for the hierarchy based on the data indicative of computing resource consumption.

15. The system according to claim 14, wherein the data indicative of computing resource consumption comprises one or more of data indicative of computing resource usage, data indicative of computing resource allocation, and data indicative of computing resource excess stock availability.

16. The system according to claim 14, wherein the one or more computing devices is configured to implement a hierarchy builder-validator-updater module for analyzing the modifications for the hierarchy against one or more policies to determine a set of valid modifications for the hierarchy, and applying the set of valid modifications for the hierarchy to the hierarchy to generate a modified hierarchy.

17. The system according to claim 14, wherein the system is operable to generate the hierarchy, and the one or more computing devices is configured to implement:
 an entities synchronization module for accessing stored data indicative of leaf nodes to be included in the hierarchy; and
 a nodes synchronization module for accessing stored data indicative of leaf nodes to be included in the hierarchy.

* * * * *